(12) United States Patent  
Ardoise et al.

(10) Patent No.: US 8,421,259 B2
(45) Date of Patent: Apr. 16, 2013

(54) WAVE ENERGY ABSORBER

(75) Inventors: Guillaume André Jean-Louis Ardoise, Nice (FR); Philippe François Michel Georges Jean, Nice (FR)

(73) Assignee: Single Buoy Moorings Inc., Marly (CH)

( * ) Notice: Subject to any disclaimer, the term of this patent is extended or adjusted under 35 U.S.C. 154(b) by 213 days.

(21) Appl. No.: 12/812,765

(22) PCT Filed: Jan. 14, 2009

(86) PCT No.: PCT/EP2009/050390
§ 371 (c)(1),
(2), (4) Date: Sep. 3, 2010

(87) PCT Pub. No.: WO2009/090192
PCT Pub. Date: Jul. 23, 2009

(65) Prior Publication Data
US 2011/0062713 A1    Mar. 17, 2011

(30) Foreign Application Priority Data

Jan. 14, 2008  (EP) .................................... 08100411
Sep. 26, 2008  (EP) .................................... 08165267

(51) Int. Cl.
*F03B 13/10* (2006.01)
*F03B 13/12* (2006.01)
*H02P 9/04* (2006.01)

(52) U.S. Cl.
USPC ............................................. 290/53; 290/42

(58) Field of Classification Search .................... 290/53, 290/42; 60/497, 498
See application file for complete search history.

(56) References Cited

U.S. PATENT DOCUMENTS

| | | | | |
|---|---|---|---|---|
| 4,754,157 | A * | 6/1988 | Windle | 290/53 |
| 6,229,225 | B1 * | 5/2001 | Carroll | 290/53 |
| 6,392,314 | B1 * | 5/2002 | Dick | 290/53 |
| 6,956,299 | B2 * | 10/2005 | Serrano Molina et al. | 290/42 |
| 7,245,041 | B1 | 7/2007 | Olson | |
| 7,319,278 | B2 * | 1/2008 | Gehring | 290/53 |

(Continued)

FOREIGN PATENT DOCUMENTS

| | | |
|---|---|---|
| DE | 34 19 565 A1 | 11/1985 |
| DE | 203 12 348 U1 | 4/2004 |

(Continued)

OTHER PUBLICATIONS

International Search Report, dated Apr. 29, 2010, from corresponding PCT application.

*Primary Examiner* — Hae Moon Hyeon
(74) *Attorney, Agent, or Firm* — Young & Thompson (57) ABSTRACT

A wave-power unit for extracting in an efficient way energy from waves on a water surface in different offshore conditions, including a main buoyant structure moored to the seabed with taut mooring lines and placed at a submerged, wave active depth, a linear generator placed within the buoyant structure and activated via a taut mooring line. The unit also includes a power take off cable connected to the linear generator and leading via the seabed to shore, and is characterized in that the buoyant structure is provided with fixed buoyancy and with elements to vary the surface of the buoyant structure that is exposed to the dynamic pressure of the wave, to optimize the surface for an efficient power take-off for more than one wave frequency and to control the tension in the taut mooring lines.

21 Claims, 8 Drawing Sheets

U.S. PATENT DOCUMENTS

| | | | |
|---|---|---|---|
| 7,538,445 B2 * | 5/2009 | Kornbluh et al. | 290/53 |
| 2002/0131824 A1 | 9/2002 | Sanchez Gomez | |
| 2004/0251692 A1 | 12/2004 | Leijon et al. | |
| 2007/0089409 A1 * | 4/2007 | Serrano Molina | 60/504 |
| 2007/0257490 A1 | 11/2007 | Kornbluh et al. | |
| 2007/0257491 A1 | 11/2007 | Kornbluh et al. | |
| 2010/0244451 A1 * | 9/2010 | Ahdoot | 290/53 |

FOREIGN PATENT DOCUMENTS

| | | |
|---|---|---|
| FR | 359 932 A | 4/1906 |
| GB | 2 267 128 A | 11/1993 |
| WO | 99/28623 A1 | 6/1999 |
| WO | 01/96738 A1 | 12/2001 |
| WO | 2005/054668 A1 | 6/2005 |

* cited by examiner

WAVE ENERGY ABSORBER

BACKGROUND OF THE INVENTION

This invention relates to the capture of energy from waves on the surface of a body of water and, particularly, to a power generating system using a taut moored wave energy absorber.

Various systems are known for capturing energy from waves passing along the surface of a body of water, particularly an ocean where quite large and powerful waves are consistently present.

Wave energy is lost by friction with the sea bottom as the sea becomes shallow (water depths of half a wavelength or less). This is most pronounced where wavelengths tend to be long. Furthermore, near shore area available for wave energy generating is often restricted due to harbor and leisure activities. Therefore, the preferred location for the present invention would be in water depths greater than 50 m in locations several miles from shore.

Wave Energy Converters (WECs) may be classified in different ways according to their operating principle and the ways in which they react with waves. In terms of practical application, only a very few types of device are presently, or in the recent past have been, in use or under test:

Point Absorbers

Point absorbers are usually axi-symmetric about a vertical axis, and by definition their dimensions are small with respect to the wavelength of the predominant wave. The devices usually operate in a vertical mode, often referred to as 'heave'. Typically, a surface-piercing floating body rises and falls with the passing waves and reacts against the seabed through a rigid structure or a taut mooring. As such they are capable of absorbing energy arising from changes in the surface level rather than from forward motion of breaking seas. The theoretical limit for the energy that can be absorbed by a single isolated, heaving, axi-symmetrical point absorber has been shown to depend on the wavelength of the incident waves rather than the cross sectional area of the device. Thus the wavelength is a critically important criterion, resulting in the attraction of locating the point absorber devices well outside the region of breaking waves, and where they will be exposed to long wavelength ocean swell or 'heave'.

Latching and Phase Control

Already disclosed is the idea to force the phase of the floating body speed to follow that of the waves load. The floating body must have a natural period significantly shorter than the wave periods. The heaving body is held at the top and/or bottom of its cycle by a hydraulically operated latching mechanism (functioning as a "parking-brake"), locking the heaving floating body to a long rod attached to the bottom of the wave channel. It is then released so that it resumes motion with speed in direction and in phase with the wave load. In this way greatly amplified motions and correspondingly larger power levels were achieved.

Variable Buoyancy Apparatus

A further development in self-reacting point absorbers incorporates a three-body point absorber comprising a surface floating body, a submerged variable buoyancy and an inertial mass. Such a device is known and described in the international application WO 99/28623.

The international application WO 0196738 discloses a wave energy conversion apparatus for harnessing energy from wave motion comprising two devices, each comprising a surface floating body and/or one submerged body below the surface with linkages between the two devices. Both devices are adapted to move relative to one another in response to passing waves or swell in the body of liquid. The relative movement between the two devices may be harnessed by the linkages between them. The connection between the surface floating body and the submerged body is sufficiently rigid to transmit tension and compression forces.

The apparatus may also include mooring systems that maintain the complete apparatus in a position that is consistent with design requirements and regulatory demands and not significantly inhibit its efficient operation. Further, the linked devices may also have elastic links or chains or shock absorbers or similar adaptations to absorb excessive relative movements in heave or surge or pitch that may be caused by breaking seas in storm conditions. Such elastic links or chains would normally be slack and may be weighted.

However, such an apparatus requires at least two bodies with a complex guiding system.

Other devices that have been developed:

GB2267128 discloses an apparatus for harnessing tidal or wave power, comprising a base structure adapted to be anchored to the sea bed, a floating structure connected to the base structure, and variable volume bags trapped between relatively movable components of structures expanding or being compressed as a result of movements of the floating structure due to tidal or wave motion. Valve-controlled inlet and outlet means for the bags enable expansion of the bag which causes it to fill with sea water and compression of the bag which causes it to expel the water which thereafter is used to generate usable energy. One pressure chamber thus expels water as the floating structure rises and the other pressure chamber expels water as the floating structure falls.

US2004251692 discloses a wave-power unit for the production of electric power of a type comprising a floating body and an electric linear generator whose reciprocating alternator by connection means is connected to the floating body and whose stator is arranged to be anchored in the bed of a sea/lake.

A common problem with existing devices designed to recover significant amounts of energy from the sea is their complexity and cost. They are predominantly large structures, with rigid components, placed in a harsh environment. There is little use of well-proven components. Most devices proposed are very demanding in terms of engineering design, deployment and maintenance.

Since one of the main purposes of developing wave energy extraction devices is to reduce the cost of energy, the costs involved in maintaining and manufacturing the wave energy extraction devices is a very important factor in the practicability of the devices. Thus, there is a need in the art for a wave energy extraction device which is inexpensive to manufacture and maintain.

Another main problem remaining is how to design an apparatus that at the same time is the efficient in operation and is able to withstand harsh offshore conditions.

SUMMARY OF THE INVENTION

It is therefore an object of the present invention to provide a wave energy absorber which is inexpensive to maintain and which is built based on well-proven technologies. The invention provides a self-adjusting system, adjusting its geometry depending on wave loads. The present invention aims at keeping the wave load on the body under a maximum allowable level in order to reduce the mooring and anchoring costs. Wave loads on a large body are proportional to wave height H and body volume V (and/or surface exposed to wave dynamic pressure): $F \sim H*V$. The invention proposes to reduce the body volume (and/or surface exposed to wave dynamic pressure) when the wave height is increased and vice versa.

The invention proposes an optimized system able to work at different wave frequencies and combining the efficient operating principles and the efficient ways to react with waves at several wave frequencies. In particular, the invention proposes to reduce body volume (and/or surface exposed to wave dynamic pressure) to a minimum in harsh wave conditions such that the maximum survival wave load is similar in amplitude to the maximum operational load when the body volume (and/or surface exposed to wave dynamic pressure) is at a maximum.

The invention proposes an optimized system able to work at different wave frequencies and wave heights and combining efficient operating and survival principles.

In accordance with the present invention there is provided a wave-power unit for extracting in an efficient way energy from waves on a water surface in different offshore conditions. The energy extracted can be transformed into electricity and transported to the grid where it can be sold or it can be converted to other useful products such as hydrogen, fresh water.

The invention includes a main buoyant structure moored to the seabed with taut mooring lines and placed at a submerged, wave active depth, a linear generator placed within the buoyant structure and activated via a taut mooring line, a power control unit and a power cable connected to the linear generator and leading via the seabed to shore and/or suspended to another wave energy absorber, with the buoyant structure being provided with fixed buoyancy and with means to vary the surface of the buoyant structure that is exposed to the dynamic pressure of the waves, to optimize the surface for an efficient power generation for more than one wave frequency and wave height and to maintain the tension in the taut mooring lines under the maximum allowable threshold value.

Preferably the means to vary the surface of the buoyant structure consists of an expandable element with a variable geometry, which can be activated by a power control unit.

In a preferred embodiment the main buoyant structure consists of multiple expandable elements, and the arrangement can be such that the multiple elongated expandable elements are placed in a cylindrical arrangement.

According to the present invention, the elongated expandable element is an elongated bladder that can be filled with a fluid to enlarge the effective surface of the expandable element. When the density of the fluid used is close to the sea water density, the variation of net the body buoyancy and thus the pretension in the mooring lines is negligible. Each expandable element is provided with a pressure relief valve. The expandable elements may contain a stretchable dielectric material to generate electricity during surface variations of the expandable element and to control the geometry of the expendable elements such as described in US200710257491 and US200710257490.

One advantage of the present invention is that the relief valve opens if a preset maximum tension force is reached in one of the mooring lines while a pumping device (that can be actuated via electricity produced by the wave power unit) is used to increase the volume of the expandable elements and by that the effective surface of the buoyant structure when the tension in one or more mooring lines is below a preset minimum. This principle creates a natural control loop of the wave load on the body that maximizes the energy absorbed in operation while protecting the system against excessive tension.

Preferably, the power control unit and the power transfer system are placed in the dry environment of the main buoyancy structure.

Another advantage of the present invention is that the buoyancy structure is provided with one part that protrudes through the sea surface, and that can be provided with a door above the water surface, so to give access to the interior of the main buoyant structure and to provide hydrostatic stability.

According to the present invention, the buoyancy structure is provided with at least two sets of inclined taut mooring lines provided with an extension member and a clump weight, each set consisting of two taut mooring lines which axes are intersecting near the buoyant structure. The extension members may have a variable stiffness so that they ensure a stiff connection between the linear generator and the seabed in operation and a soft connection under harsh survival conditions.

A further advantage of the present invention is that the expandable element can be fitted with a spring loaded appendage that is activated by the pressurization of the expandable element so that the flushing of the fluid out of the expandable element, for instance prior to storm conditions, is totally passive.

The present wave energy absorber is based on a taut mooring using cables which cannot transfer compressive loads. Therefore, the linear generator should ideally work only on the extension of the lines. Therefore, the present invention is well suited to the use of stretchable dielectric material (such as EAP) as linear generator because they typically store elastic energy during the first half of the cycle (stretching) and convert it to electrical energy during the other half (back to original length). Stretchable dielectric material does not generate electrical power under compression.

BRIEF DESCRIPTION OF THE DRAWINGS

Preferred embodiments of the invention will now be described with reference to the accompanying drawings, in which.

DETAILED DESCRIPTION OF PREFERRED EMBODIMENTS

In the present invention, the wave energy absorber is used to absorb the energy of waves using the fundamental principles of the Bristol cylinder.

In a Bristol cylinder, wave forces on a submerged cylindrical body are substantially changed if the cylindrical element is being rotated around the axis of the cylinder. In fact, throughout the motion of the cylinders, energy will be absorbed through a power conversion mechanism, which converts the slow reciprocating motion into usable energy. According to the present invention the power conversion system is placed within the buoyant structure in a dry environment.

Figure 1:
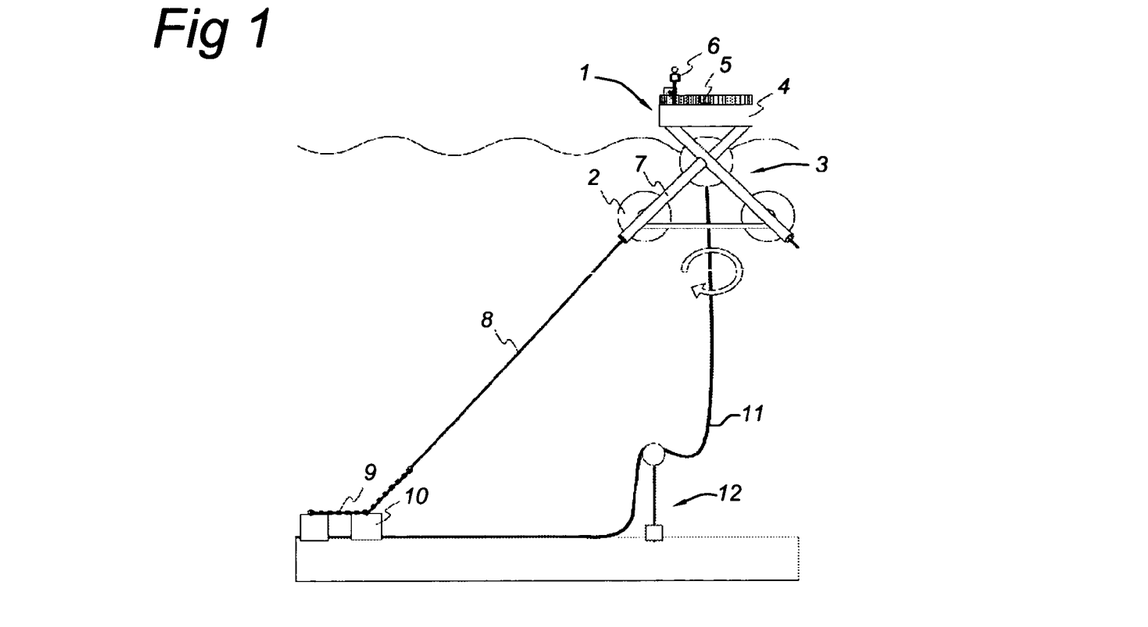
FIG. 1 shows a side view of an embodiment of an overall installation including the wave energy absorber according to the present invention.

FIG. 1 shows a side view of an embodiment of an overall installation including the wave energy absorber shown in FIG. 1. The wave energy absorber 1 is composed, in this particular embodiment, of three expandable elements 2 that are part of a buoyant structure 3 taut moored to the seabed via taut mooring lines 8. The deck structure 4 is supported above sea level.

It appears clearly that the open structure members 7 of the buoyant structure 3 are crossing each other so that expandable elements 2 are in a triangle configuration. The mooring line angles are selected to optimize the motion of the system. As common for Bristol cylinders, ideally the motion of the wave energy absorber 1 should be circular (see the arrow nn FIG. 1) in order to generate a wave only in the same direction as the incoming wave but with an opposite phase to obtain cancellation.

The mooring line orientation is also optimized to take into account the distribution of wave incidence angles.

The taut mooring line 8 is composed of cable (steel or synthetic fibers) for the major part of the water column and a clump weight such as heavy chain 9 near the sea bed. The heavy bottom chain weight is selected to maintain minimum tension in the cable when the wave energy absorber 1 is heaving downwards.

The inclination of the mooring line 8 will preferably be about 45°. This is the preferred orientation as there will be less friction, and the system 1 will be able to do work both during heave and sway. Inclination will be fine-tuned in order to obtain the right natural periods in heave and sway motions.

The anchors 10 used can be of different types such as vertically loaded anchors, gravity anchors, suction piles, driven piles etc.

To transfer the electric energy generated in the wave energy absorber 1, the energy is brought to a cable 11 that will transfer it to a user. The cable 11 is placed near the mooring elements so as not to pick up appreciable mooring loads that could cause it to fail.

In the embodiment shown in FIG. 1, the cable has a steep S configuration, in that the cable relies on a buoy 12 lying under the wave active zone that is connected to the seabed.

Figure 2:
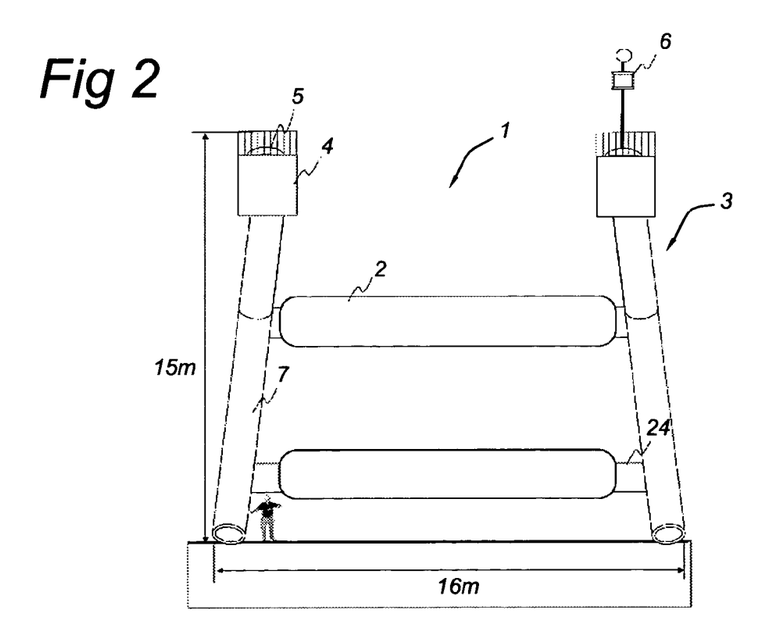
FIG. 2 shows a view of an embodiment of a wave energy absorber according to the present invention.

FIG. 2 shows a view of an embodiment of a wave energy absorber 1 according to the present invention. The wave energy absorber is composed of several cylindrical expandable elements 2 that are part of a buoyant structure 3 taut moored to the seabed. The buoyant structure is composed of a platform or deck 4. The deck 4 offers an easy access with a door 5 above the water surface. There are also signal means 6 located on the deck 4.

The buoyant structure 3 is also composed of open structure members 7 underneath the deck 4.

In the particular embodiment shown in FIG. 2, the buoyant structure 3 is composed of two symmetrical parts (each one composed of a deck and open structures) linked together by a support structure 24 to which the expandable elements 2 are fixed. In the embodiment shown in FIG. 2, the distance between the two symmetrical parts of the 15 buoyant structure 3 is about 16 meters and the height of the buoyant structure 3 is about 15 meters.

FIGS. 3a to 5b show different views of a wave energy absorber according to the invention, in different wave sea states.

The system according to the invention combines the most efficient operating principle at all wave's frequencies. This can be realized by having a fixed structure and a variable volume, or by having a fixed volume and a variable draft. The purpose of the invention is to decrease the wave load on the system to withstand heavy sea states with one and the same mooring system.

Figure 3A:
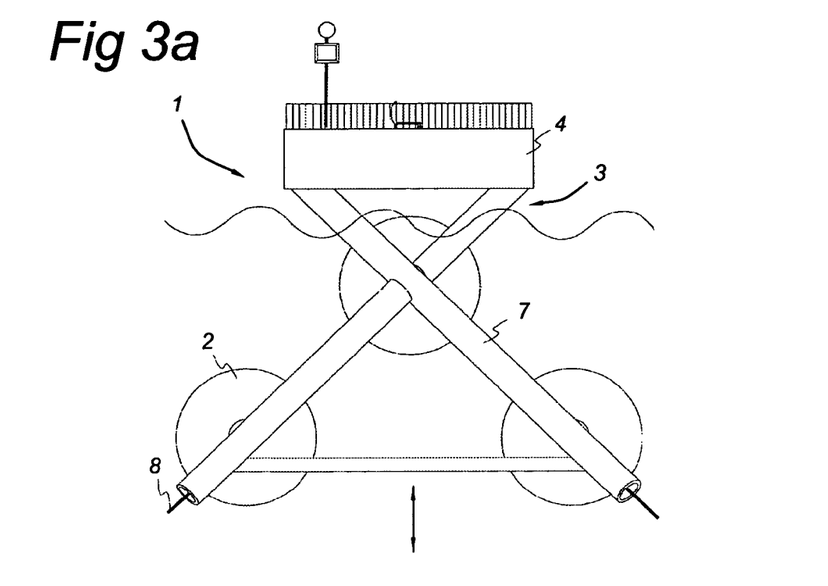
FIGS. 3*a* and 3*b* show different views of a wave energy absorber according to the invention in a heave absorbing mode, in small sea states.
Figure 3B:
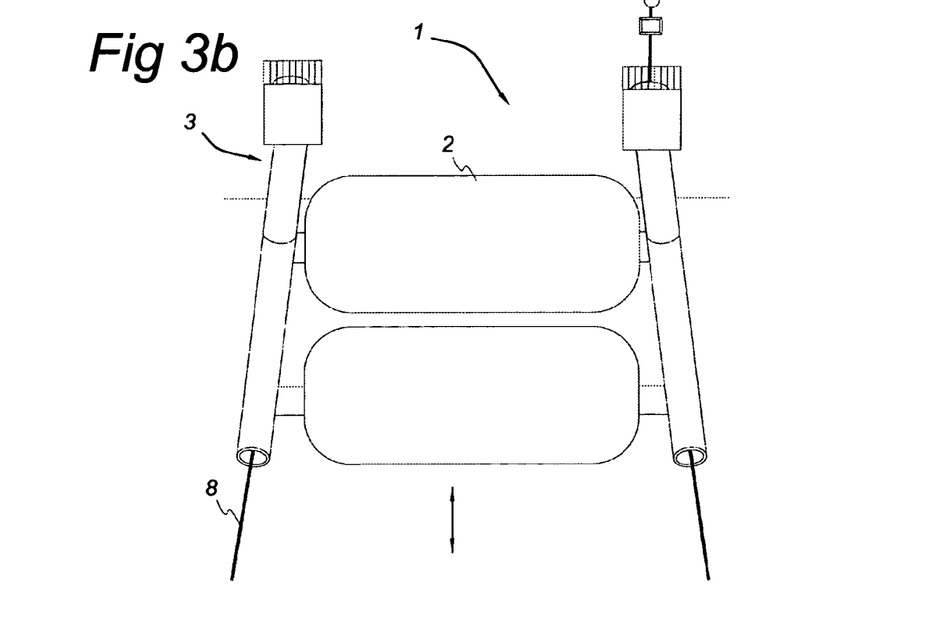

FIGS. 3a and 3b show different views of a wave energy absorber according to the invention in a heave wave sea state.

In a heave mode, the height of the waves is approximately 1 meter, the period of the wave is less than 10 seconds. In these sea states, the cylindrical expandable elements 2 will be fully inflated (diameter about 5 meters) and the system will cut the water plane area and acts as a point absorber (almost behaving like a SPAR buoy, see arrow). The configuration of the wave energy absorber 1 is the same as the one described in FIGS. 1 and 2.

Figure 4A:
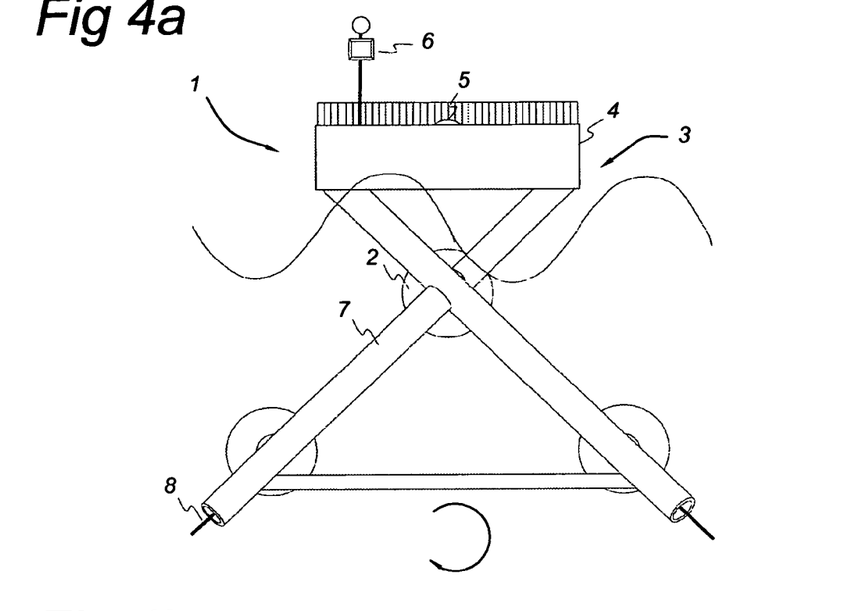
FIGS. 4*a* and 4*b* show different views of a wave energy absorber according to the invention in a sway and heave mode, in high sea states.
Figure 4B:
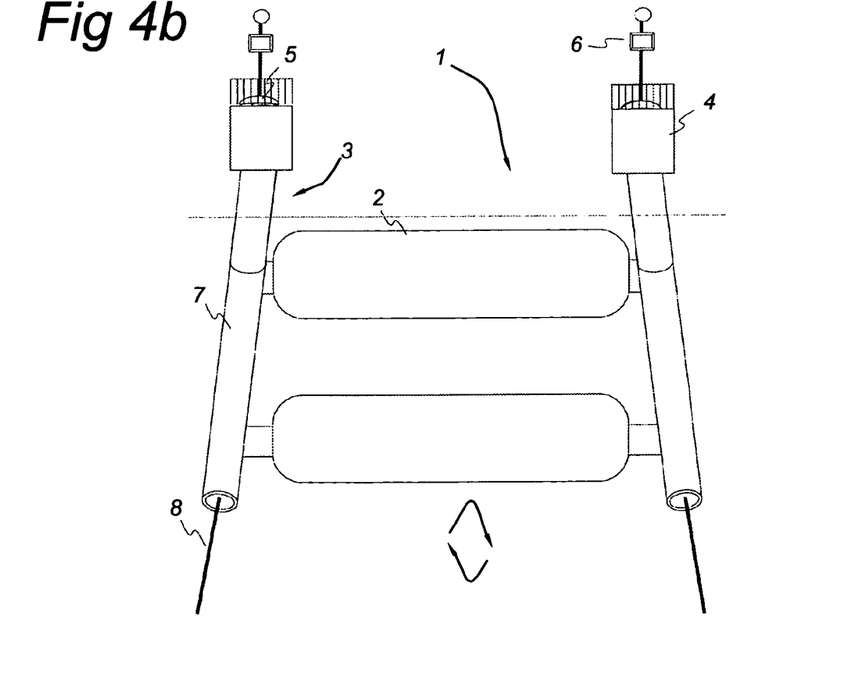

FIGS. 4a and 4b show different views of a wave energy absorber according to the invention in a high wave sea state.

In a high sea state, the height of the waves is about 3 meters; the period of the wave is about 7 to 15 seconds. In this state the bladder will deflate (diameter about 3 meters) so that the system will be completely submerged and the system will behave more and more like a Bristol cylinder. The configuration of the wave energy absorber 1 is the same as the one described in FIGS. 1 and 2.

Figure 5A:
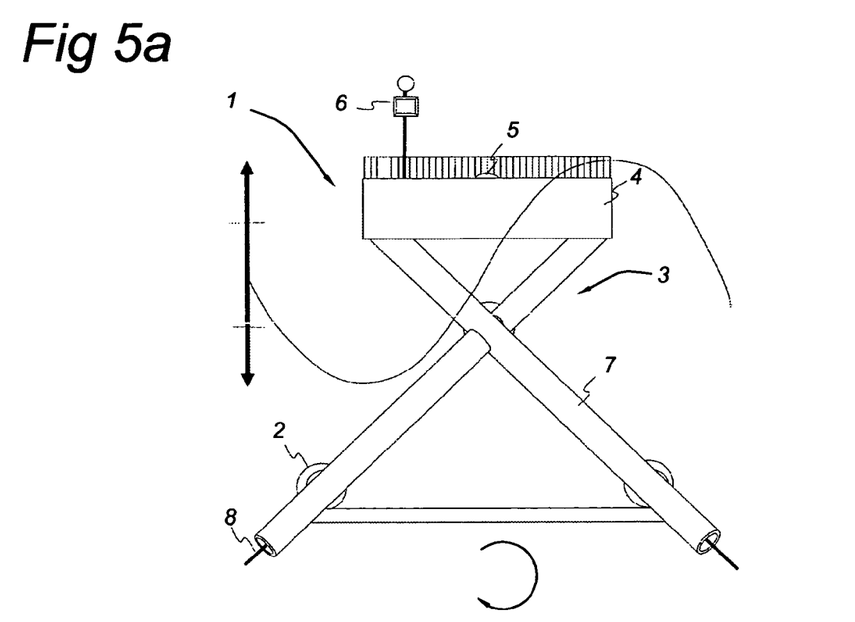
FIGS. 5*a* and 5*b* show different views of a wave energy absorber according to the invention in a survival sea state.
Figure 5B:
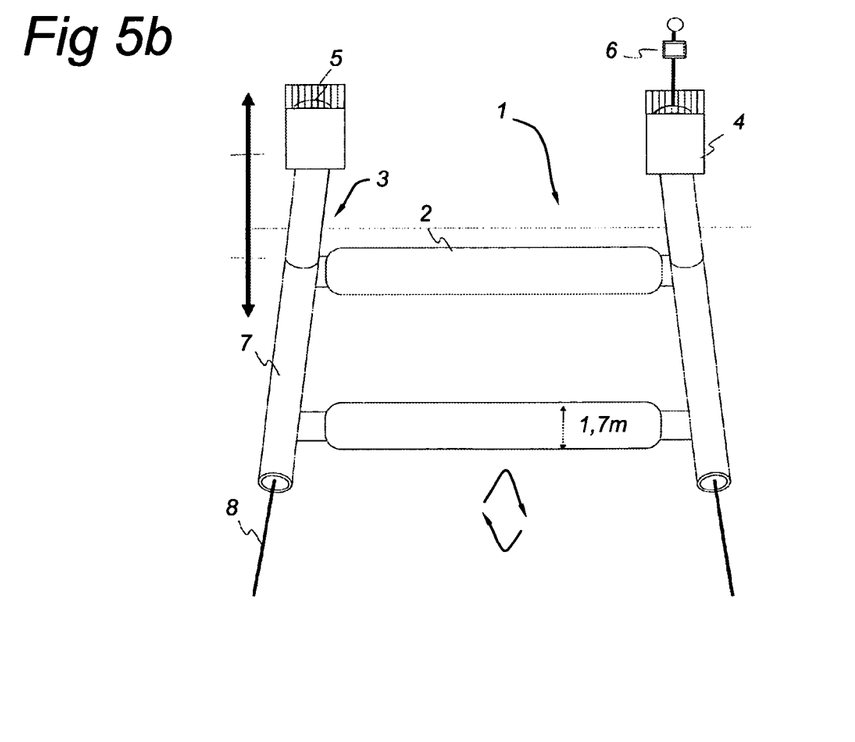

FIGS. 5a and 5b show different views of a wave energy absorber according to the invention in a survival state.

In a survival state, the height of the waves is about 20 meters; the period of the wave is 15 about 18 seconds. In this exceptional sea state, the expandable elements 2 will be completely deflated (diameter about 1.7 meter), the system being a frame like structure much more transparent to waves.

The survival system is completely passive. The importance of the reliability of the valves used is therefore crucial. In a preferred embodiment, plastic valves are used. The advantage of such valves is that no marine life can set the inside.

The expandable elements 2 are fitted with fail safe valves (not shown) that will open if a preset maximum extension is reached in one of the mooring line 8. As the expandable elements are pressure inflated, the fluid contained in the expandable elements will be passively flushed by the expandable element skin restoring its potential elastic energy.

When the extension in all the mooring lines 8 are falling bellow a preset minimum extension, a pump is used to inflate the expandable elements 2 to increase the volume and thus the wave loads.

The pump is directly actuated by the mooring line 8, so that the system uses the wave energy to inflate again its expandable elements 2. This can be achieved by a separate simple reliable hydraulic pump (for ex. diaphragm or reciprocal) or by the main power take off system driving an electrical pump. The power take off (PTO) system will be described in further detail below.

In case the expandable elements elasticity is limited and insufficient to flush the water passively, this simple pump could be used in reverse flow to empty the bladders.

If the PTO is hydraulic and uses sea water as working fluid the expandable elements may be used as a pressure reservoir.

Provided that the expandable elements material can withstand multiple cycles of inflation/deflation, the volume control system may be used to constantly optimize the volume of the expandable elements according to the incident wave energy. The system is self-limiting the load on mooring lines 8 and naturally makes the best use of the available PTO extension range.

An alternate volume control system can also be proposed. The expandable elements 2 can be made of a non-elastic skin. In this case, the expandable elements are fitted with spring loaded appendages that arrange the skin in such a manner that the expandable elements once emptied, offer minimal surface and volume to external flow.

The spring appendages are activated by the pressurization of the expandable elements. Hence, the volume reduction in case of excessive mooring line extension remains passive. Arrangement can consist in (but are not limited to) folding, rolling-up, bellows. The spring loaded appendages can be (but are not limited to) elastic rings, stretchers, pneumatic elements etc. and can either be external or internal to the expandable elements. Fail safe valves and pump arrangements remain similar.

Expandable elements 2 can be fenders, which would present a further advantage of having a new use of a well-proven technology. More details on the expandable elements are given below, see FIGS. 9 and 10.

Figure 6A:
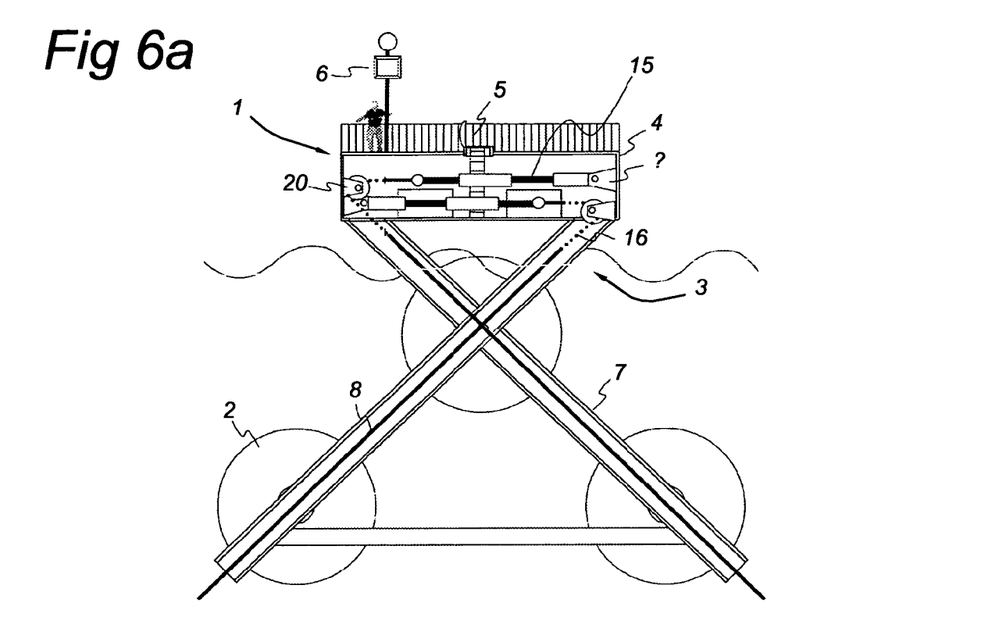
FIGS. 6*a* and 6*b* show side views of different embodiments of control mechanism of the wave energy absorber shown in FIG. 2, FIGS. 6*c* and 6*d* show different views of another embodiment of a wave energy absorber according to the present invention and its control mechanism.
Figure 6B:
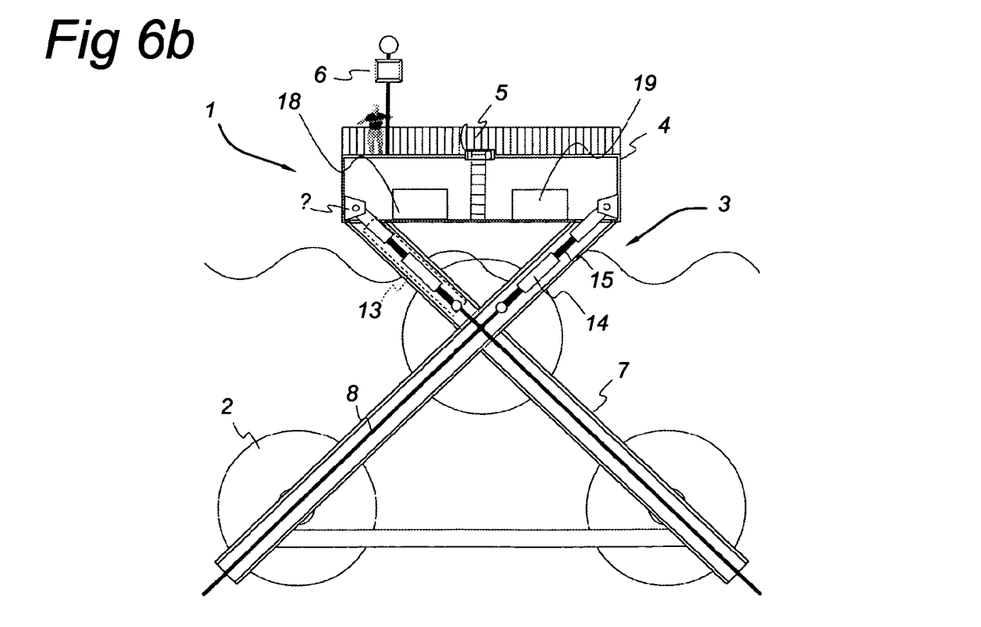
Figure 6C:
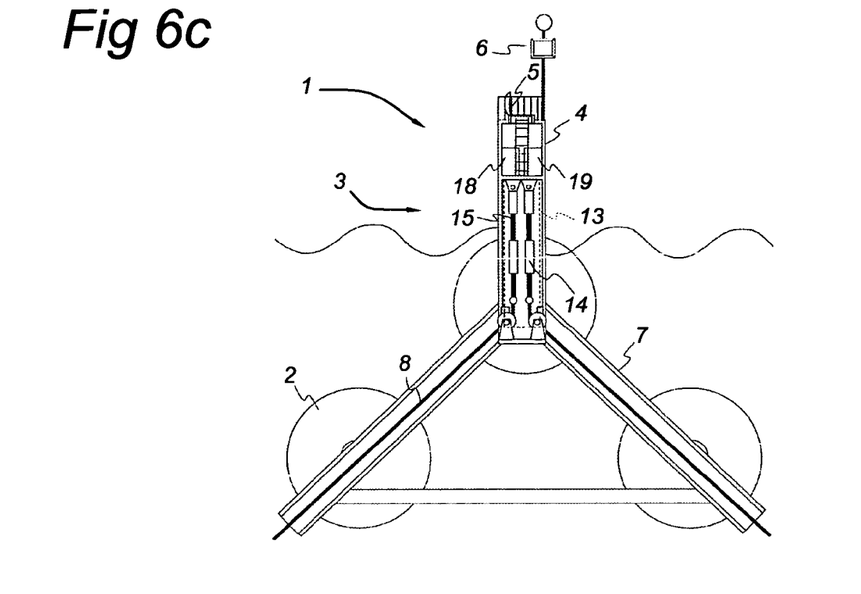
Figure 6D:
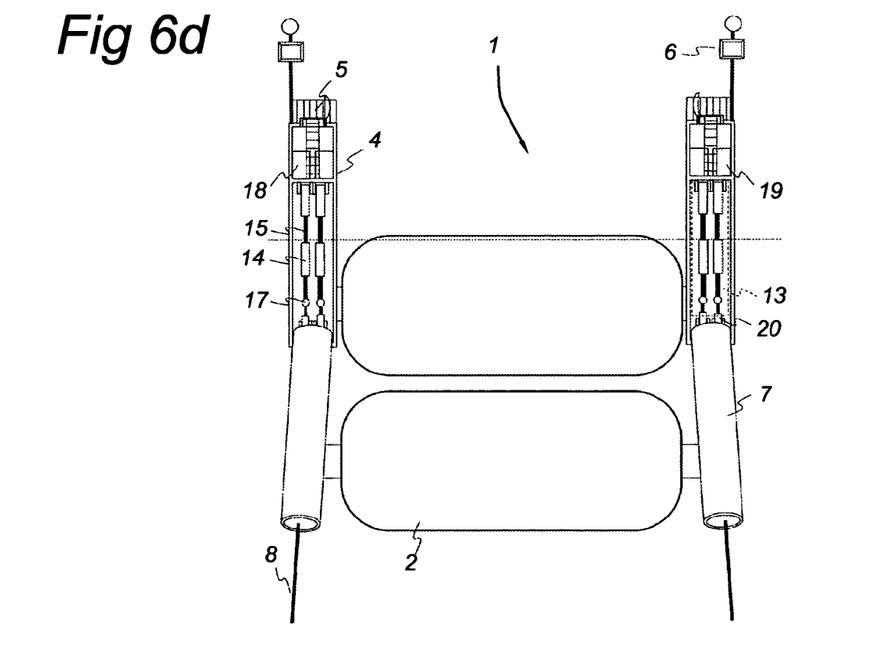

FIGS. 6a and 6b show side views of different embodiments of a control mechanism of the wave energy absorber shown in FIG. 2. FIGS. 6c and 6d show different views of another embodiment of a control mechanism of the wave energy absorber.

It appears clearly from these figures that in order to excite the generator 13 it is essential that the system is being taut moored.

A spring type actuator is shown, with a spring 15 that can provide a large elongation and which is placed in an easily accessible part of the system. It could be an elastomeric spring, of the kind made by SEAFLEX. This spring will be linked to the mooring lines 8 via a power take off cable 16 that will pass via a sprocket 20. The actuator will be interconnected to the sprocket 20 so that it will react depending on the load exerted on the spring 15.

As shown in FIGS. 6a to 6d the power take off (PTO) system 14 is inside the buoyant structure 3.

In the present invention, the PTO system 14 is using the extension of the taut mooring system 8 under wave loads. The PTO can also be used as an actuator to control and optimize power production (several known control techniques may be used, such as reactive control, phase control, latching). It may use a combination of different systems such as electromechanical system, electro-active polymer system, hydraulic systems, mechanical systems or piezo-electric systems (this list being non-limitative).

One generator 13 is connected directly at the end of each taut mooring line 8. It allows large extensions and contractions of the mooring lines through a soft spring 15 and damper arrangement. The extensions/contractions are large enough to allow the system to undergo the maximum wave-induced motions in operational and survival conditions without reaching a sudden increase in the rigidity of the mooring lines 8.

An alternative is to propose the use of stretchable dielectric materials (such as Electro Active Polymers) as generators and actuators to apply the required control strategy. These stretchable dielectric materials have the capacity to stretch considerably and have the required high power density.

In FIG. 6a, the control mechanism is located in the deck 4 of the buoyant structure 3. In this embodiment the PTO 14 is a hydraulic actuator. In this configuration the access to the control mechanism is easy via the door 5 which is above water level on the deck 4. In this embodiment, the cable 16 linking the mooring line 8 to the spring 15 can be partly made of chain steel cable to minimize the fatigue due to the friction at the sprocket 20 level.

In FIG. 6b, the control mechanism is located in the open structure members 7 of 30 the buoyant structure 3. In this configuration there are no fatigue issues, but the access to the PTO 14 and spring arrangement 15 is less practical than in FIG. 6a. The access to the power unit control 18 and the pumping device 19 is still easy as they are still located in the deck 4 of the buoyant structure 3.

In FIG. 6c, the configuration of the buoyant structure 3 is changed. In this particular embodiment, the wave energy absorber 1 is composed of three cylindrical expandable elements 2 that are part of a buoyant structure 3 taut moored to the seabed. The three expandable elements are disposed each at an apex of a triangle as seen in FIG. 6c (front view).

The buoyant structure is composed of a platform or deck 4. The deck 4 offers an easy access with a door 5 above surface water. There are also signal means 6 located on the top of the deck 4. The buoyant structure 3 is also composed of open structure members 7 underneath the deck 4. In the particular embodiment shown in FIGS. 6c and 6d, the deck 4 and the two symmetrical open structure members 7 intersect at the level of the upper expandable element 2. As shown in FIG. 6a, the control mechanism is located in the deck 4 of the buoyant structure 3. In the configuration of FIG. 6c, the access to the control mechanism is really easy via the door 5. As shown before, the cable 16 can be partly made of chain steel cable to minimize the fatigue due to the friction at the sprockets 20 level.

Figure 7:
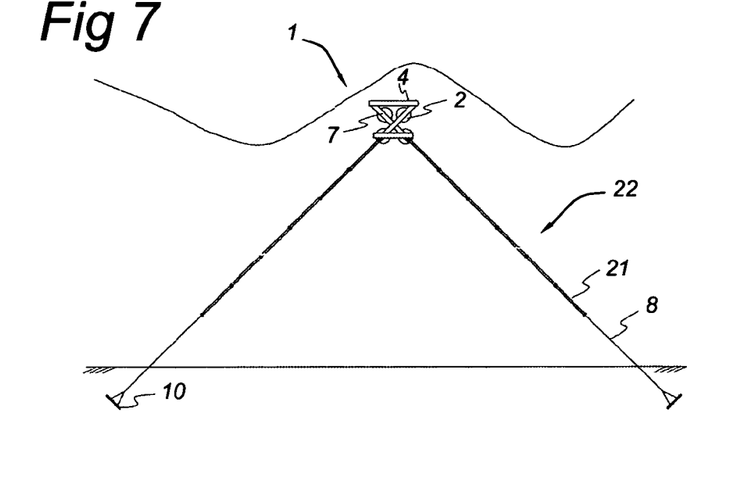
FIG. 7 shows another embodiment according to the present invention with an alternative arrangement of the mooring lines.

FIG. 7 shows another embodiment according to the present invention with an alternative arrangement of the mooring lines 8, of a wave energy absorber 1.

The wave energy absorber is composed of several cylindrical expandable elements 2 that are part of a buoyant structure 3 taut moored to the seabed.

The buoyant structure is composed of a platform or deck 4. The buoyant structure 3 is also composed of open structure members 7 underneath the deck 4.

In this particular embodiment, there are four expandable elements 2, each being at an apex of a square. The open structure members 7 are inclined as in the embodiments detailed before, aligned with the taut mooring lines 8.

In order to reinforce the control of the variable tension applied to the mooring line, the present invention proposes to use hose pumps 22. In fact within the hose-pump, made of several hose strings 21, is a slender hollow elastic cylinder capable of pumping fluid when it is extended and contracted. When the hose-pump is connected to the buoyant structure 3, wave action can be harnessed to produce pressurized fluid via cyclic extensions. An inlet valve at the bottom enables to fill the pump hose with a determined amount of water. Water is incompressible and, hence, when the tension on the mooring lines increases, and the water cannot be extracted from hose strings 21, the longitudinal stiffness of the pump hose will increase. However, on each hose string 21 there is a pressure relief valve. Hence when the tension applied on the mooring lines reaches a certain point, the pressure relief valves open and water is extracted, so that the mooring lines become soft over a certain wave load, the tension increasing only slowly and shock loads being avoided. The hose string may be split in two parts, for instance one part that is used as a hose pump to run a turbine to generate power.

The other part is fitted with the pressure relief valve and serves as a tension limiter as explained above.

Figure 8:
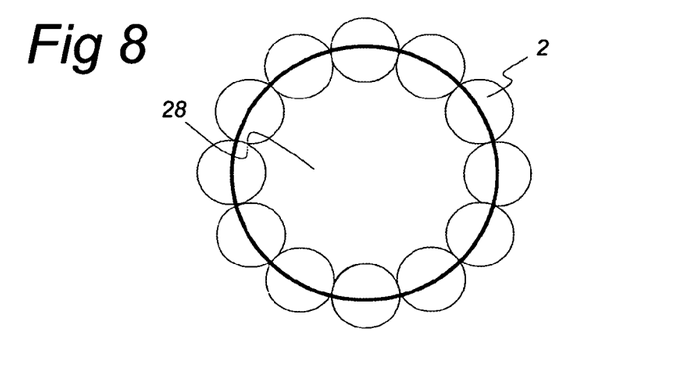
FIG. 8 shows a front view of another embodiment of the use of expandable elements to form a cylinder of trapped water.

FIG. 8 shows a front view of another embodiment of the use of expandable elements to form a cylinder of trapped water in a heave wave sea state. In this embodiment the Bristol cylinder will not be the expandable element 2 filled with a fluid, but a cylinder of trapped sea water 28, the surface of the cylinder being composed of several expandable elements 2 disposed in a circle. When inflated the expandable elements are in contact one with another so that an important volume of sea water is trapped. This particular configuration enables to create a Bristol cylinder that can have a diameter of about 12 meters, which is much bigger than the 5 meters obtained with the embodiment shown in FIG. 3b.

Figure 9:
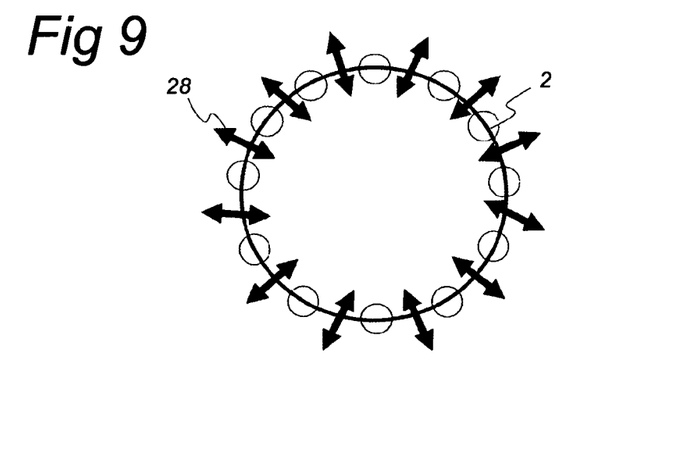
FIG. 9 shows the same embodiment as in FIG. 8 but in a survival sea state.

FIG. 9 shows the same embodiment as in FIG. 8 but in a survival sea state Applying the same principle explained previously, each expandable element 2 is provided with a pressure relief valve that will open when a preset maximum tension force is reached in one of the mooring lines 8. Once deflated, the expandable elements are not in contact with one another, so the trapped sea water can flow.

Hence in a survival state, the structure will be rather transparent to wave loads and the tension that is applied on the mooring lines 8 will not lead to failure.

Figure 10:
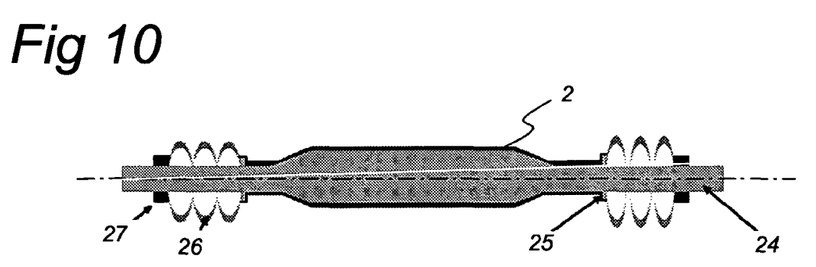
FIG. 10 shows an embodiment of an expandable element used in the present invention when deflated.

FIG. 10 shows an embodiment of an expandable element 2 used in the present invention when deflated. At rest, the expandable element skin sticks to the support structure 24. In order to achieve this state, the support structure has a larger diameter in the middle. Due to its elasticity of the expandable element skin and to the configuration of the support structure even after several cycles of inflation and deflation (leading to creeping and bending in of the extendable element 2), the expandable element skin is always tightly in contact with the support structure when the expandable element is deflated. In this particular embodiment, each extremity of the expandable element has sliding flanges or rings 25. There are other fixed flanges 27 that can be for example bolted to the support structure 24. Between the slidable flanges 25 and the fixed flanges 27 there is an expansion joint or below 26 that can accommodate the longitudinal dilation of the expandable element 2 when inflating.

Figure 11:
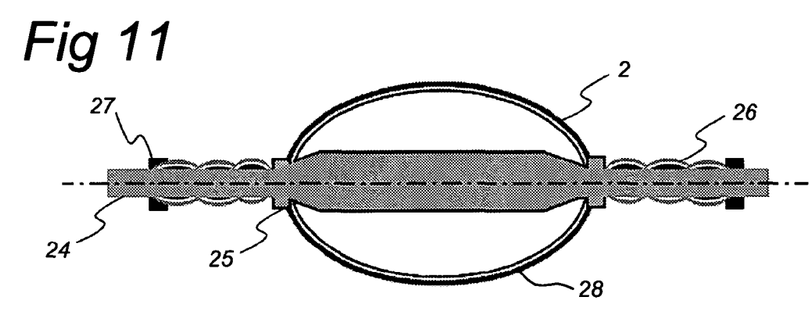
FIG. 11 shows the expandable element of FIG. 9 when inflated.
Figure 12:
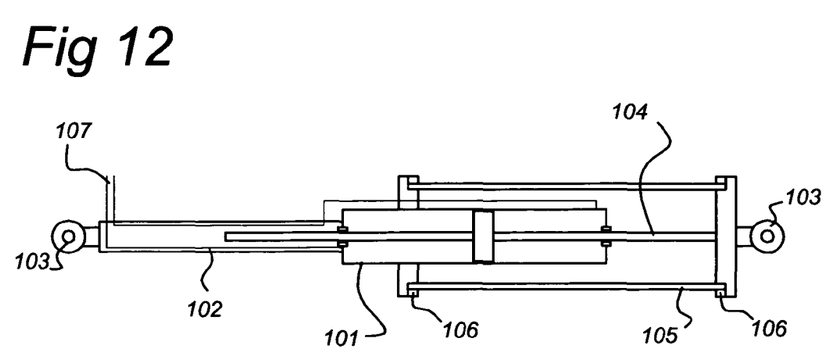
FIG. 12 shows details on the linear hydraulic power conversion system that can be used with the wave energy converter system according to the invention.

FIG. 11 shows the expandable element 2 of FIG. 9 when inflated.

A fluid 26 is injected through the supporting structures 24. As the fluid goes through the supporting structure 24, the internal pressure in the expandable element 2 increases. As the internal pressure exceeds the external pressure, the expandable elements will inflate. As it inflates, the diameter of the expandable element will increase, therefore it will expand in the radial direction and hence it will shrink in the longitudinal direction.

The shrinkage in the longitudinal direction will lead the bellows to be stretched in order to accommodate the change in length (See arrows in FIG. 11).

Once the internal pressure is no longer maintained, the bladder in conjunction with the spring-loaded bellows comes back to its original position as shown in FIG. 10. The expandable element 2 will be in tight contact with the support structure 24 (even after several cycles of inflating/deflating). This is due in part to the elasticity of the material used but also to the fact that once stretched the bellows become spring loaded. They will then be able to restore the force that will enable the expandable element to get back to its original shape and position.

The internal pressure can be maintained for example by means of closed valves or via a continuous injection of liquid.

The wave energy absorber system according to the present invention can also be designed as a bundle of several structures as the one shown in the described figures. To optimize the efficiency of the system, the distance between each structure is predetermined.

In fact, distances between each structure are carefully optimized using diffraction analysis, in order to have the highest total non-viscous force (wave loads) on the bundle. This is due to the fact that, the Froude-Krylov force is the force introduced by the unsteady pressure field generated by undisturbed waves (FK). The Froude-Krylov force is together with the diffraction force the total non-viscous forces acting on a floating body in regular waves. The diffraction force is due to the floating body disturbing the waves.

The total FK on several buoyant structures arranged in a bundle is equal to the sum of the FK on each buoyant structure, but the diffraction force on several buoyant structures arranged in a bundle is greater than the sum of the diffraction forces on each buoyant structure due to constructive interferences between the structures.

Therefore, for a given total displacement, the total non-viscous forces will be higher with a configuration of several buoyant structures arranged in a bundle (with regards to a configuration of one big buoyant structure), hence this configuration will provide a higher energy.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A wave energy absorber system for converting energy from waves on a water surface in different offshore conditions, comprising a buoyant structure (3) adapted to be moored to a seabed with taut mooring lines (8) and placed at a submerged, wave active depth, a linear generator (13) placed within the buoyant structure (3) and activated via a taut mooring line (8), a power control unit (18) and a power take off system (14) connected to the linear generator (13) and leading via the seabed to shore, wherein the buoyant structure (3) is provided with fixed buoyancy and with a mechanism to vary the surface of the buoyant structure (3) that is exposed to the dynamic pressure of the wave, to optimize the surface for an efficient power take-off for more than one wave frequency and to control the tension in the taut mooring lines (8), wherein the mechanism to vary the surface of the buoyant structure (3) comprises an expandable element (2) with a variable geometry, and wherein the mechanism to vary the surface of the buoyant structure (3) is activated by the power control unit (18).

2. The wave energy absorber system according to claim 1, wherein the buoyant structure (3) comprises multiple expandable elements (2).

3. The wave energy absorber system according to claim 2, wherein the multiple expandable elements (2) are placed in a cylindrical arrangement.

4. The wave energy absorber system according to claim 1, wherein the elongated expandable element (2) is an elongated bladder that can be filled up with a fluid to enlarge the effective surface of the expandable element.

5. The wave energy absorber system according to claim 1, wherein the power take off system (14) is placed within a dry environment of the buoyant structure (3).

6. The wave energy absorber system according to claim 1, wherein the power control unit (18) is placed in a dry environment of the buoyant structure (3).

7. The wave energy absorber system according to claim 1, wherein the buoyant structure (3) is provided with at least one part (4) that protrudes through the sea surface.

8. The wave energy absorber system according to claim 7, wherein the at least one protruding part (4) is provided with a door (5) above water surface, so to give access to the interior of the main buoyant structure (3).

9. The wave energy absorber system according to claim 1, wherein the buoyant structure (3) is provided with at least two sets of inclined taut mooring lines (8), each set comprising two or more taut mooring lines (8) defining axes that are intersecting near the buoyant structure (3).

10. The wave energy absorber system according to claim 1, wherein the taut mooring line is provided with a clump weight (9).

11. The wave energy absorber system according to claim 1, wherein the expandable element (2) comprises stretchable dielectric material as a linear generator to generate electricity during surface variations of the expandable element (2).

12. The wave energy absorber system according to claim 1, wherein the expandable element (2) is provided with a pressure relief valve.

13. The wave energy absorber system according to claim 12, wherein the pressure relief valve opens if a preset maximum tension force is reached in one of the mooring lines (8).

14. The wave energy absorber system according to claim 2, wherein when the tension in one or more mooring lines (8) is below a preset minimum, a pumping device (19) is used to increase the volume of the expandable elements (2) and by that the effective surface of the buoyant structure (3).

15. The wave energy absorber system according to claim 14, wherein the pumping device (19) is actuated via electricity produced by the wave power unit.

16. The wave energy absorber system according to claim 14, wherein the expandable element (2) is adapted to be fitted with a spring loaded appendage (15) that is activated by the pressurization of the expandable element (2), and the volume reduction of the expandable element (2) in case of excessive mooring line extension remains passive.

17. The wave energy absorber system according to claim 15, wherein the expandable element (2) is adapted to be fitted with a spring loaded appendage (15) that is activated by the pressurization of the expandable element (2), and the volume reduction of the expandable element (2) in case of excessive mooring line extension remains passive.

18. The wave energy absorber system according to claim 1, wherein the expandable element (2) comprises stretchable dielectric materials that can be inflated and/or deflated.

19. The wave energy absorber system according to claim 1, wherein the expandable element (2) is attached to a support structure (24) via a sliding flange (25) and the surface is kept in tight contact with the support structure (24).

20. The wave energy absorber system according to claim 1, wherein the expandable element (2) is fixed to a support structure (24) via a sliding flange (25) and a spring loaded bellows (26), the bellows being stretched to accommodate the shrinkage in the longitudinal direction of the expandable element (2) when inflated.

21. The wave energy absorber system according to claim 1, wherein several buoyant structures (3) are arranged in a bundle configuration, the distance between each buoyant structure (3) being predetermined.

* * * * *

UNITED STATES PATENT AND TRADEMARK OFFICE
CERTIFICATE OF CORRECTION

PATENT NO.       : 8,421,259 B2  
APPLICATION NO. : 12/812765  
DATED            : April 16, 2013  
INVENTOR(S)      : Ardoise et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this
Eighth Day of September, 2015

Michelle K. Lee
*Director of the United States Patent and Trademark Office*